(12) United States Patent
Lin

(10) Patent No.: US 11,583,131 B2
(45) Date of Patent: Feb. 21, 2023

(54) FOLDABLE POUR OVER COFFEE DRIPPER

(71) Applicant: Sue-Hwa Shiau Lin, Tainan (TW)

(72) Inventor: Sue-Hwa Shiau Lin, Tainan (TW)

( * ) Notice: Subject to any disclaimer, the term of this patent is extended or adjusted under 35 U.S.C. 154(b) by 395 days.

(21) Appl. No.: 16/849,380

(22) Filed: Apr. 15, 2020

(65) Prior Publication Data

US 2021/0251414 A1 Aug. 19, 2021

(30) Foreign Application Priority Data

Feb. 19, 2020 (TW) ................................ 109201829

(51) Int. Cl.
*A47J 31/02* (2006.01)
*A47J 31/06* (2006.01)
*A47J 31/00* (2006.01)

(52) U.S. Cl.
CPC ............. *A47J 31/02* (2013.01); *A47J 31/005* (2013.01); *A47J 31/0626* (2013.01); *A47J 31/0636* (2013.01)

(58) Field of Classification Search
CPC ...... A47J 31/02; A47J 31/005; A47J 31/0626; A47J 31/0636
USPC ....... 210/481, 464, 469, 470, 471, 473, 474, 210/476, 479, 480, 495; 99/306, 279, 99/323; 426/433; 211/181.1; 55/379
See application file for complete search history.

(56) References Cited

U.S. PATENT DOCUMENTS

| | | | | |
|---|---|---|---|---|
| 2,863,376 | A * | 12/1958 | Grose | A47J 31/02 210/474 |
| 4,885,987 | A * | 12/1989 | Franke | A47J 31/08 99/295 |
| 7,685,931 | B2 * | 3/2010 | Rivera | A47J 31/08 206/0.5 |
| 2015/0366395 | A1 * | 12/2015 | Do | A47J 31/0615 99/323 |

* cited by examiner

*Primary Examiner* — Madeline Gonzalez
(74) *Attorney, Agent, or Firm* — Rosenberg, Klein & Lee

(57) ABSTRACT

A foldable pour over coffee dripper is disclosed herein. It comprises a standing wall, a supporting frame pivotally connected to a first end of the standing wall, a basal plate pivotally connected to a second end of the standing wall, and a filter unit connected at a bottom of the supporting frame, wherein the filter unit has a first end connected to a bottom of the supporting frame, plural turns and a second end and is gradually tapered from the first end to the second end thereof in an axial direction.

12 Claims, 4 Drawing Sheets

FOLDABLE POUR OVER COFFEE DRIPPER

BACKGROUND OF THE INVENTION

1. Field of the Invention

The present invention relates to a foldable pour over coffee dripper which can be folded to reduce volume and is convenient for storage and travel.

2. Description of Related Art

Pour over coffee is made by placing ground coffee in a coffee filter lining inside the coffee dripper, and placing the coffee dripper on top of a vessel. Hot water is intermittently poured onto the ground coffee. As the hot water seeps through the ground coffee and passes through the filter paper, the liquid extracting from the coffee is collected in a vessel.

Generally, pour over coffee drippers on the market are made of plastic, stainless steel, ceramic, or glass, which occupy a certain volume and cannot be folded or stored easily. Therefore, the conventional filter cups are difficult and inconvenient to travel with or to carry outdoors.

SUMMARY OF THE INVENTION

In view of the above-mentioned problems, the object of the present invention is to provide a foldable pour over coffee dripper which can be folded to reduce volume and is convenient for storage and travel.

The foldable pour over coffee dripper of the present invention comprises a standing wall, a supporting frame pivotally connected to one (superior) edge of the standing wall, a basal plate pivotally connected to a second end of the standing wall and a filter unit connected to a bottom of the supporting frame. The standing wall has a first concave groove disposed at the first end thereof, two first ear portions respectively formed at two sides of the first concave groove, a second concave groove disposed at the second end thereof, and two second ear portions respectively formed at two sides of the second concave groove. The supporting frame has a first annular frame, a first through hole at a center of the first annular frame, and a first base portion extended from one end of the first annular frame for pivotally connecting to the two first ear portions and to be correspondingly accommodated in the first concave groove. The filter unit is made in a structure of a helical coil and has a first end connected to the bottom of the supporting frame, plural turns and a second end connected to the first end by continuous connection of the plural turns, wherein a pitch is formed between every two of the adjacent turns, and the filter unit is gradually tapered from the first end to the second end thereof in an axial direction so that the filter unit is formed in a conical shape.

The basal plate has a second annular frame, a second through hole at a center of the second annular frame, a second base portion extended from one end of the second annular frame for pivotally connecting to the two second ear portions and to be correspondingly accommodated in the second concave groove.

According to an embodiment of the present invention, a pivot axis of the two first ear portions and a pivot axis of the two second ear portions are spaced apart from each other without overlapping when projected longitudinally onto a plane.

According to an embodiment of the present invention, the standing wall has a perforation.

According to an embodiment of the present invention, the plural turns are formed by a single continuous strand.

According to an embodiment of the present invention, the filter unit is flexible.

Compared to the techniques available now, the present invention has the following advantages:

1. The supporting frame and the basal plate of the present invention can be folded towards each other and rest parallel to the standing wall, and the filter unit can be compressed and rest within the circular hole of the supporting frame. This reduces the volume of the present invention and allows easy storage and travel.

2. The filter unit of the present invention, which is connected to the bottom of the supporting frame, has the plural turns formed by a single continuous strand and a pitch formed between every two adjacent turns in an axial direction. The filter unit is gradually tapering from the top to the bottom thereof in an axial direction, so that it can be compressed for easy storage and travel.

DETAILED DESCRIPTION OF THE PREFERRED EMBODIMENT

Hereinafter, an exemplary embodiment of the present invention will be described in detail with reference to the accompanying drawings.

Figure 1:
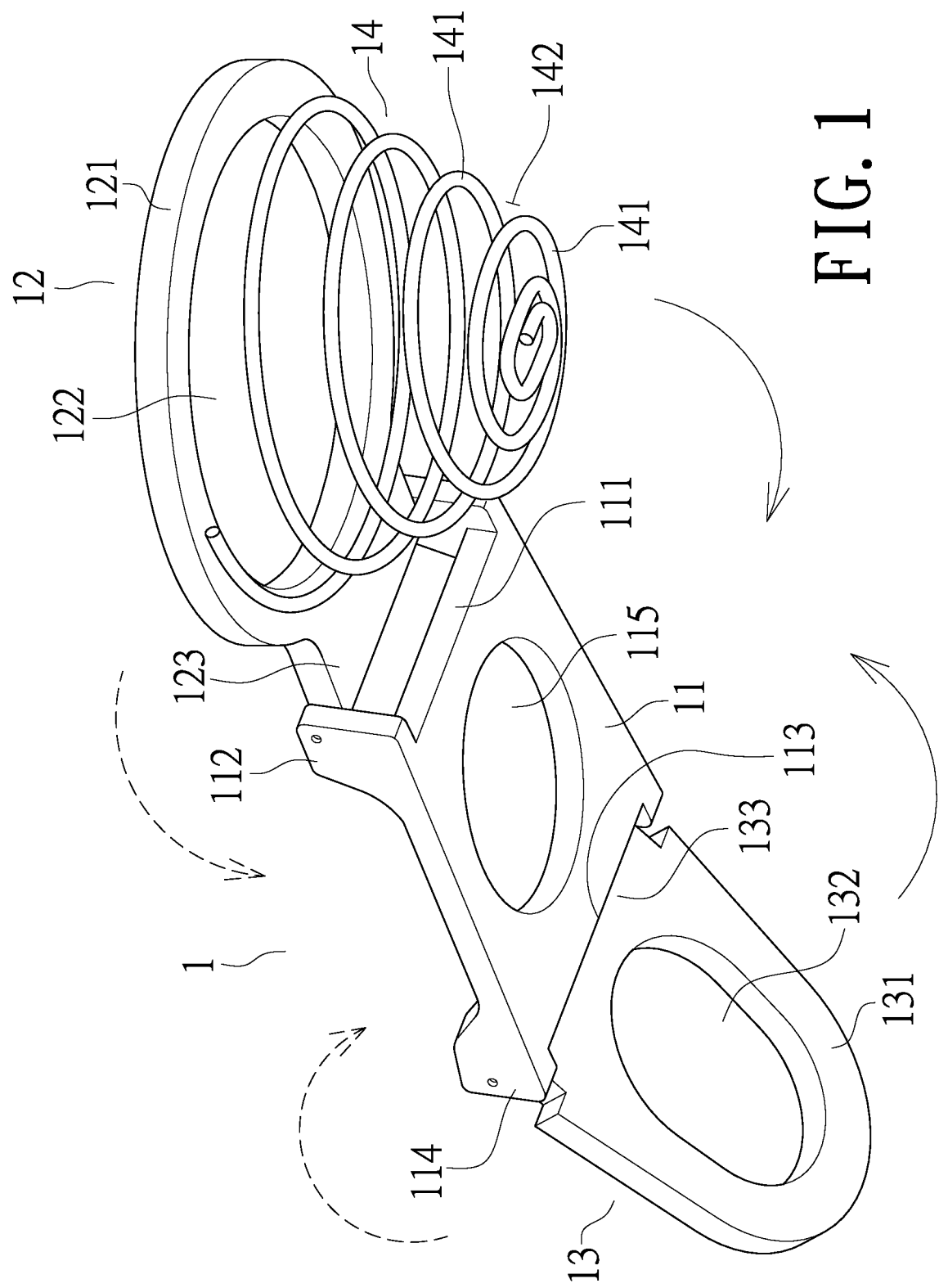
FIG. 1 is a stereogram showing a foldable pour over coffee dripper in extended state according to the present invention.
Figure 2:
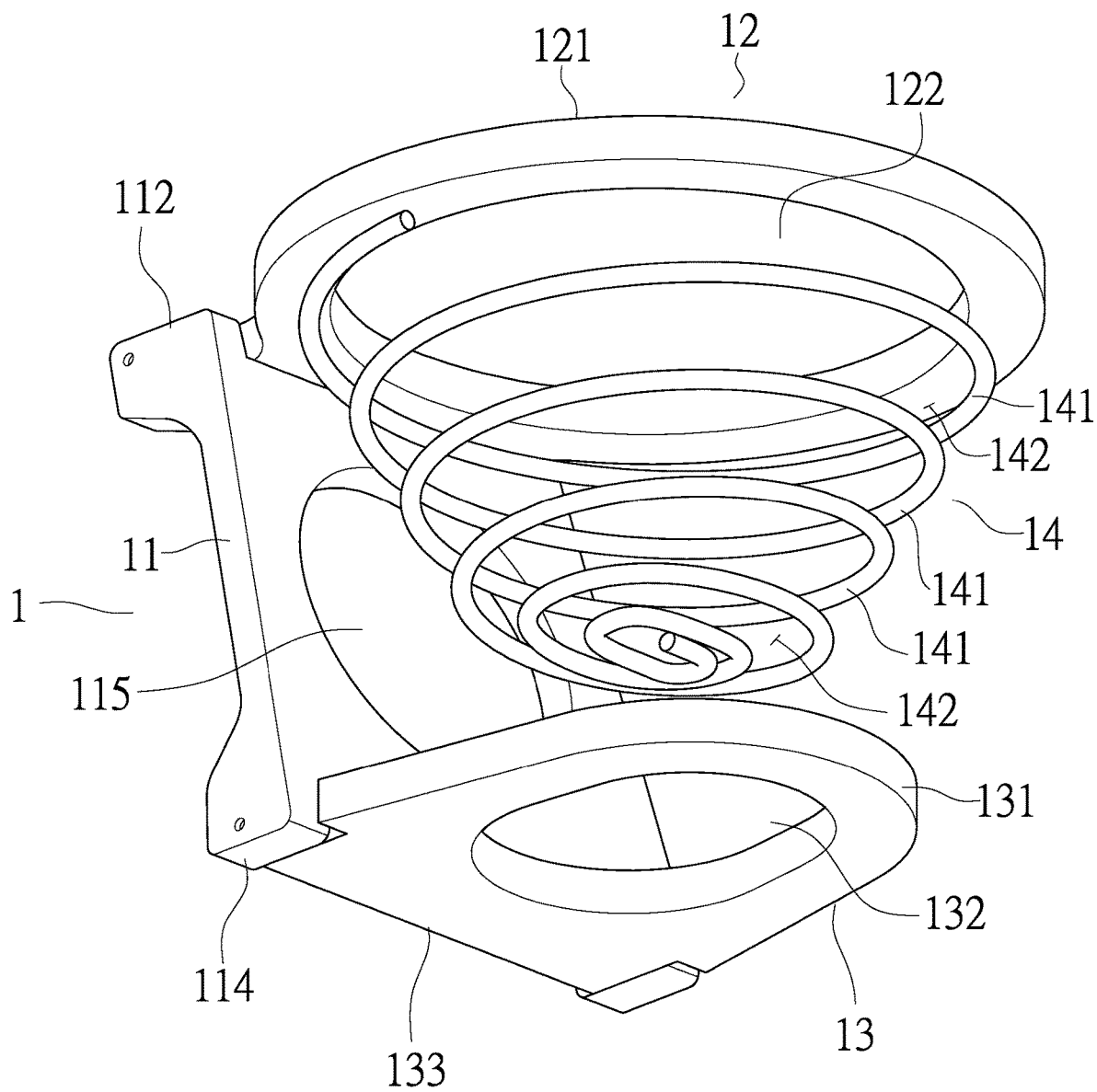
FIG. 2 is a stereogram showing the foldable pour over coffee dripper in use according to the present invention.

As shown in FIG. 1 and FIG. 2, a foldable pour over coffee dripper (1) is disclosed herein. The foldable pour over coffee dripper (1) mainly comprises a standing wall (11), a supporting frame (12), a basal plate (13) and a filter unit (14).

The standing wall (11) has a first end, a second end opposite to the first end, a first concave groove (111) disposed at the first end thereof, two first ear portions (112) respectively formed at two sides of the first concave groove (111), a second concave groove (113) disposed at the second end thereof, and two second ear portions (114) respectively formed at two sides of the second concave groove (113).

The supporting frame (12) is pivotally connected to the two first ear portions (112) at the first end of the standing wall (11), and the basal plate (13) is pivotally connected to the two second ear portions (114) at the second end of the standing wall (11). Preferably, a pivot axis of the two first ear portions (112) for pivotally connecting to the supporting frame (12) is disposed at a position deviated from a central line of the first concave groove (111), and a pivot axis of the two second ear portions (114) for pivotally connecting to the basal plate (13) is disposed at a position deviated from a central line of the second concave groove (113).

Furthermore, the supporting frame (12) has a first annular frame (121), a first through hole (122) at a center of the first annular frame (121), and a first base portion (123) extended from one end of the first annular frame (121) for pivotally connecting to the two first ear portions (112) and to be correspondingly accommodated in the first concave groove (111).

The basal plate (13) has a second annular frame (131), a second through hole (132) at a center of the second annular frame (131), a second base portion (133) extended from one end of the second annular frame (131) for pivotally connecting to the two second ear portions (114) and to be correspondingly accommodated in the second concave groove (113).

The filter unit (14) is structured as a helical coil and has a first end connected to the bottom of the supporting frame (12), plural turns (141) and a second end connected to the first end by continuous connection of the plural turns (141). A pitch (142) is formed between every two of the adjacent turns (141). Furthermore, the filter unit (14) is gradually tapered from the first end to the second end thereof in an axial direction so that the filter unit (14) forms a conical shape. Preferably, the plural turns (141) are formed by a single continuous strand so that the filter unit (14) can be compressed to reduce its height for easy storage and travel.

Figure 3:
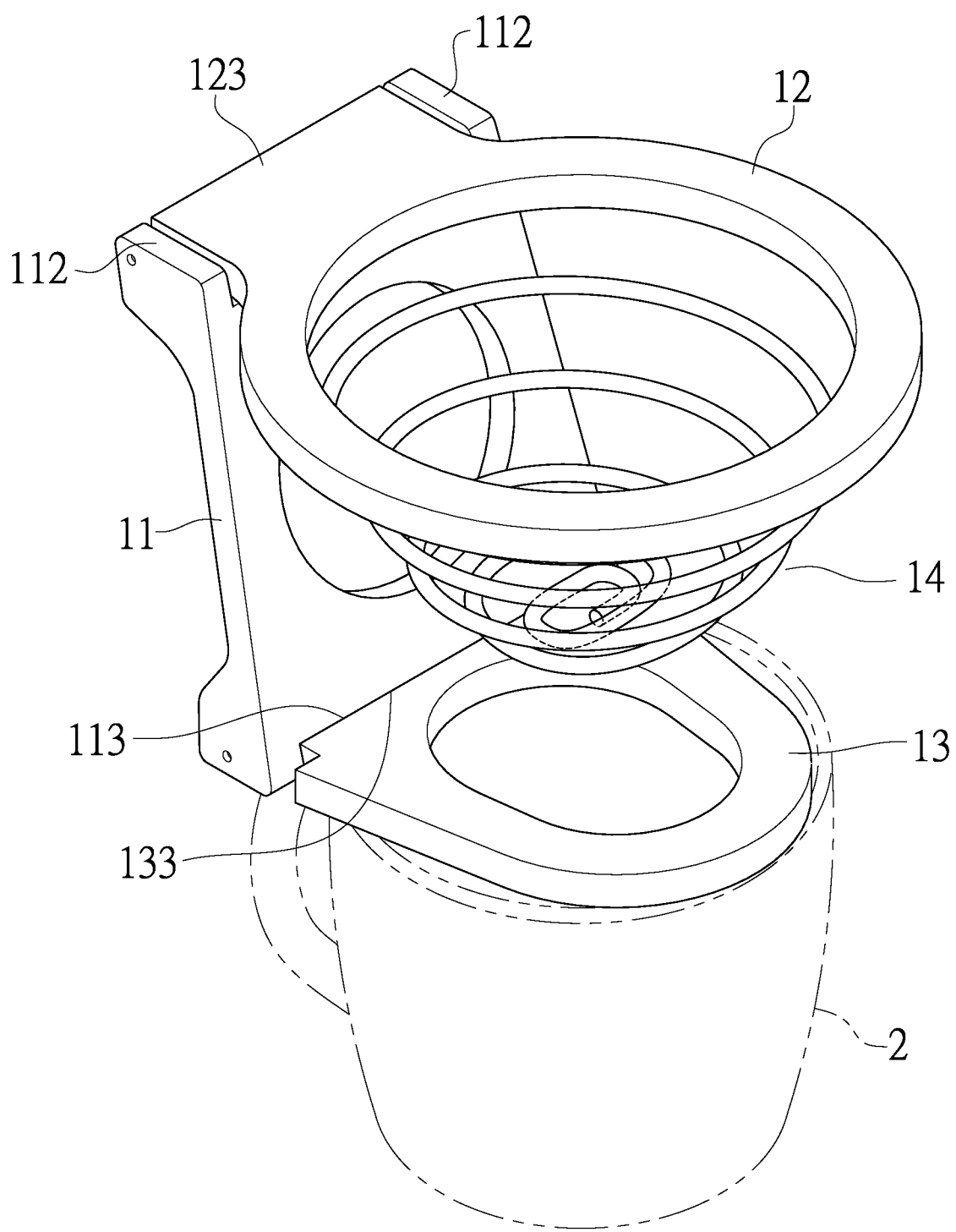
FIG. 3 is a stereogram showing the foldable pour over coffee dripper in use for brewing coffee according to the present invention.

Accordingly, when the present invention is in use as shown in FIG. 1 and FIG. 2, the supporting frame (12) is bent in the direction indicated by the solid arrows until the first base portion (123) of the supporting frame (12) contacts the first concave groove (111) and further movement is restricted by the first concave groove (111). In this way, the supporting frame (12) is pivotally connected to the first end of the standing wall (11) at 90 degrees, and the plural turns (141) of the filter unit (14) extend down and expand into a cone-shaped space. Then, the basal plate (13) is likewise bent in the direction indicated by the solid arrows until the second base portion (133) of the basal plate (13) contacts the second concave groove (113) and further movement is restricted by the second concave groove (113). In this way, the basal plate (13) is pivotally connected to the second end of the standing wall (11) at 90 degrees and can be placed on top of a vessel (2), e.g. a coffee cup, as shown in FIG. 3. Finally, a pour over coffee filter paper is placed within the cone-shaped space of the filter unit (14), and an appropriate amount of ground coffee is added to the pour over coffee filter paper. After hot water is poured onto the coffee to pass through the pour over coffee filter paper, the liquid coffee extract flows out of the filter unit (14) and collects in the vessel (2).

Figure 4:
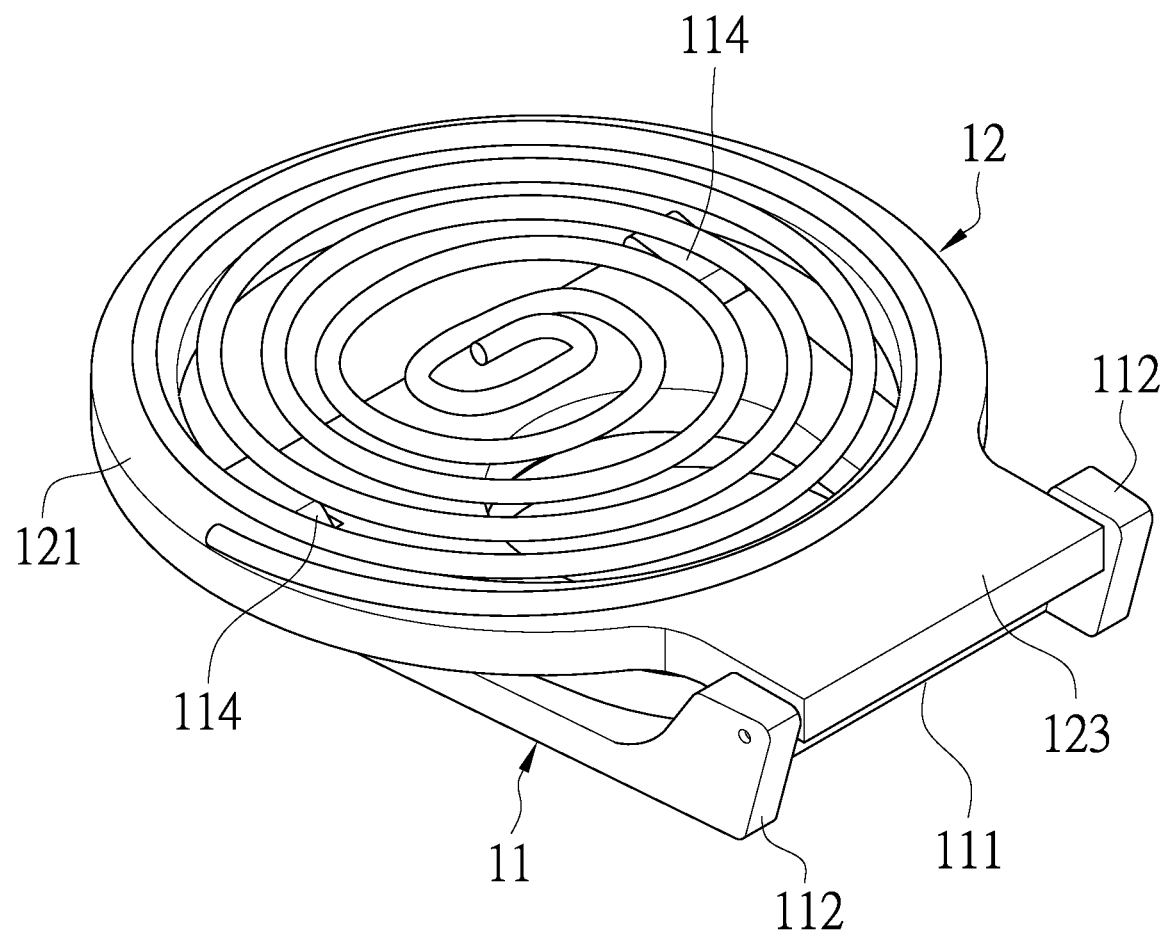
FIG. 4 is a stereogram showing the foldable pour over coffee dripper in its folded state according to the present invention.

After use, the supporting frame (12) and the basal plate (13) are bent in the directions indicated by the dotted arrows in FIG. 1 until both the supporting frame (12) and the basal plate (13) are parallel to one side of the standing wall (11), then the plural turns (141) of the filter unit (14) are moved toward the first through hole (122) at the center of the supporting frame (12), which reduces the volume of the foldable pour over coffee dripper (1) as shown in FIG. 4. Accordingly, the present invention achieves the goals of easy storage and travel.

Preferably, the pivot axis of the two first ear portions (112) for pivotally connecting to the first base portion (123) and the pivot axis of the two second ear portions (114) at each side of the inferior concave groove (113), for pivotally connecting to the second base portion (133) of the basal plate (13), are spaced apart from each other without overlapping when projected longitudinally onto a plane. This can prevent the supporting frame (12) and the basal plate (13) from colliding with each other during folding, and keep the present invention flat after folding.

Preferably, the standing wall (11) has a perforation (115) in order to reduce the weight of the foldable pour over coffee dripper (1) and the material cost of manufacturing the foldable pour over coffee dripper (1).

What is claimed is:

1. A foldable pour over coffee dripper, comprising:
   a standing wall having a first concave groove disposed at a first end thereof, two first ear portions respectively formed at two sides of the first concave groove, a second concave groove disposed at a second end thereof, and two second ear portions respectively formed at two sides of the second concave groove;
   a supporting frame pivotally connected to the first end of the standing wall and having a first annular frame, a first through hole at a center of the first annular frame, and a first base portion extended from one end of the first annular frame for pivotally connecting to the two first ear portions and to be correspondingly accommodated in the first concave groove;
   a basal plate pivotally connected to the second end of the standing wall and having a second annular frame, a second through hole at a center of the second annular frame, a second base portion extended from one end of the second annular frame for pivotally connecting to the two second ear portions and to be correspondingly accommodated in the second concave groove; and
   a filter unit structured as a helical coil having a first end connected to a bottom of the supporting frame, plural turns and a second end connected to the first end by continuous connection of the plural turns, wherein the filter unit is gradually tapered from the first end to the second end thereof in an axial direction and a pitch is formed between every two of the adjacent turns to form a conically shaped space bounded by the helical coil for supporting a filter therein.

2. The foldable pour over coffee dripper as claimed in claim 1, wherein a pivot axis of the two first ear portions and a pivot axis of the two second ear portions are spaced apart from each other without overlapping when projected longitudinally onto a plane.

3. The foldable pour over coffee dripper as claimed in claim 1, wherein the standing wall has a perforation.

4. The foldable pour over coffee dripper as claimed in claim 2, wherein the standing wall has a perforation.

5. The foldable pour over coffee dripper as claimed in claim 3, wherein the plural turns are formed by a single continuous strand.

6. The foldable pour over coffee dripper as claimed in claim 4, wherein the plural turns are formed by a single continuous strand.

7. The foldable pour over coffee dripper as claimed in claim 5, wherein the filter unit is flexible.

8. The foldable pour over coffee dripper as claimed in claim 6, wherein the filter unit is flexible.

9. The foldable pour over coffee dripper as claimed in claim 1, wherein the plural turns are formed by a single continuous strand.

10. The foldable pour over coffee dripper as claimed in claim 2, wherein the plural turns are formed by a single continuous strand.

11. The foldable pour over coffee dripper as claimed in claim 9, wherein the filter unit is flexible.

12. The foldable pour over coffee dripper as claimed in claim 10, wherein the filter unit is flexible.

* * * * *